(12) United States Patent
Major (10) Patent No.: US 11,962,844 B2
(45) Date of Patent: *Apr. 16, 2024

(54) AUTOMATED REPLACEMENT OF VIDEO PROGRAM CONTENT

(71) Applicant: SLING TV L.L.C., Englewood, CO (US)

(72) Inventor: R. Drew Major, Orem, UT (US)

(73) Assignee: Sling TV L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/157,727

(22) Filed: Jan. 20, 2023

(65) Prior Publication Data

US 2023/0164384 A1 May 25, 2023

Related U.S. Application Data

(63) Continuation of application No. 16/514,865, filed on Jul. 17, 2019, now Pat. No. 11,564,002, and a
(Continued)

(51) Int. Cl.
*H04N 7/16* (2011.01)
*H04N 21/24* (2011.01)
*H04N 21/41* (2011.01)
*H04N 21/422* (2011.01)
*H04N 21/439* (2011.01)
(Continued)

(52) U.S. Cl.
CPC ..... *H04N 21/4394* (2013.01); *H04N 21/2407* (2013.01); *H04N 21/41265* (2020.08); *H04N 21/42209* (2013.01); *H04N 21/42224* (2013.01); *H04N 21/44222* (2013.01); *H04N 21/4622* (2013.01); *H04N 21/4722* (2013.01); *H04N 21/47815* (2013.01); *H04N 21/812* (2013.01); *H04N 21/8173* (2013.01)

(58) Field of Classification Search
CPC ........... H04N 21/4394; H04N 21/2407; H04N 21/41265; H04N 21/42209; H04N 21/42224; H04N 21/44222; H04N 21/4622; H04N 21/4722; H04N 21/47815; H04N 21/812; H04N 21/8173; H04N 21/44204; H04N 21/4331; H04N 21/4334; H04N 21/44016; H04N 21/6543; H04N 21/6582
See application file for complete search history.

(56) References Cited

U.S. PATENT DOCUMENTS

| | | | | |
|---|---|---|---|---|
| 10,154,319 B1 * | 12/2018 | Ramakrishnan | ....... | G06Q 50/01 |
| 2003/0009385 A1 * | 1/2003 | Tucciarone | ............... | H04L 9/40 705/26.1 |

(Continued)

*Primary Examiner* — Annan Q Shang
(74) *Attorney, Agent, or Firm* — KW Law, LLP (57) ABSTRACT

Advertisements in broadcast television programming are digitally replaced with different ads prior to viewing. Replacement can occur in time and/or place shifted content, and can be used to promote a particular advertisement that the viewer has not yet seen, thereby improving the reach of the ad without oversaturation. Data reporting by the playback devices is collected in a database of viewed ads. The information in the database can be used to refresh previously-viewed ads, to increase saturation of particular ads, to replace previously-broadcast but no longer relevant ads, or for other purposes as desired.

18 Claims, 5 Drawing Sheets

Related U.S. Application Data continuation-in-part of application No. 15/393,548, filed on Dec. 29, 2016, now Pat. No. 11,463,785, and a continuation-in-part of application No. 13/836,688, filed on Mar. 15, 2013, now Pat. No. 10,212,490, said application No. 16/514,865 is a continuation-in-part of application No. 15/856,405, filed on Dec. 28, 2017, now Pat. No. 10,412,446, and a continuation-in-part of application No. 15/600,334, filed on May 19, 2017, now abandoned, which is a continuation of application No. 14/216,235, filed on Mar. 17, 2014, now Pat. No. 9,661,380.

(60) Provisional application No. 62/274,106, filed on Dec. 31, 2015, provisional application No. 62/699,473, filed on Jul. 17, 2018, provisional application No. 62/440,013, filed on Dec. 29, 2016, provisional application No. 61/800,847, filed on Mar. 15, 2013.

(51) Int. Cl.
*H04N 21/442* (2011.01)
*H04N 21/462* (2011.01)
*H04N 21/4722* (2011.01)
*H04N 21/478* (2011.01)
*H04N 21/81* (2011.01)

(56) References Cited

U.S. PATENT DOCUMENTS

| | | | |
|---|---|---|---|
| 2003/0067554 A1* | 4/2003 | Klarfeld | G11B 27/322 725/135 |
| 2009/0222851 A1* | 9/2009 | Talmi | H04N 21/812 725/32 |
| 2009/0235307 A1* | 9/2009 | White | H04N 21/812 725/34 |
| 2011/0157475 A1* | 6/2011 | Wright | H04H 20/14 348/700 |
| 2011/0194833 A1* | 8/2011 | Jong | H04N 21/4532 386/248 |
| 2012/0020651 A1* | 1/2012 | Gilson | H04N 21/235 386/296 |
| 2012/0166289 A1* | 6/2012 | Gadoury | H04L 65/611 709/219 |
| 2014/0037264 A1* | 2/2014 | Jackson | H04N 21/44222 386/E5.052 |
| 2014/0201797 A1* | 7/2014 | Kim | H04N 21/4348 725/116 |
| 2014/0259038 A1* | 9/2014 | Belyaev | H04N 21/4667 725/14 |
| 2017/0359626 A1* | 12/2017 | Chen | H04N 21/4667 |
| 2018/0343484 A1* | 11/2018 | Loheide | G06Q 30/0633 |

\* cited by examiner

AUTOMATED REPLACEMENT OF VIDEO PROGRAM CONTENT

PRIORITY CLAIM

This application is a continuation of U.S. patent application Ser. No. 16/514,865 filed on Jul. 17, 2019, which claims priority to U.S. Provisional Application Ser. No. 62/699,473 filed on Jul. 17, 2018. Application Ser. No. 16/514,865 is also a continuation-in-part of U.S. patent application Ser. No. 15/393,548 filed on Dec. 29, 2016, which claims benefit of U.S. Provisional Application Ser. No. 62/274,106 filed on Dec. 31, 2015 and is a continuation-in-part of U.S. application Ser. No. 13/836,688 filed on Mar. 15, 2013, now U.S. Pat. No. 10,212,490. Application Ser. No. 16/514,865 is also a continuation-in-part of U.S. application Ser. No. 15/856,405 filed on Dec. 28, 2017, which claims benefit of U.S. Provisional Application Ser. No. 62/440,013 filed on Dec. 29, 2016 and is a continuation-in-part of U.S. application Ser. No. 15/600,334 filed May 19, 2017, which is a continuation of application Ser. No. 14/216,235 filed on Mar. 17, 2014 (now U.S. Pat. No. 9,661,380), which claims benefit of U.S. Provisional Application Ser. No. 61/800,847 filed on Mar. 15, 2013. All of these applications are incorporated herein by reference.

TECHNICAL FIELD

The present disclosure generally relates to automated replacement of broadcast television content. More particularly, the following discussion relates to automatically replacing certain digital advertisements or other portions of a digitally-broadcast media program.

BACKGROUND

As television receivers, media players and other media playback devices become increasingly sophisticated, additional functions and features have been enabled. Many modern media devices are now capable of enhancing the viewer's access to media content through place and time shifting, video on demand, local and remote storage digital video recorders and/or any number of other features, to provide just a few examples.

As player capabilities become more sophisticated, advertisers are facing increasing challenges in providing advertising content that is engaging and relevant to a wide number of viewers. While advertisers often attempt to improve the reach and frequency of their advertisements, in practice this can be extraordinarily difficult, particularly as digital video recorders (DVRs) and similar technologies make ad skipping easier than ever.

While it would be desirable to replace ads that are stored in DVR content and/or to perform other actions that would improve the reach and frequency of various digital ads, this can be very difficult to implement in practice. Amongst the challenges that are encountered, it can be very difficult for a cable, direct broadcast satellite (DBS) or other content distributor to know in advance when certain commercials will be run, making it very difficult to place identifiers or the like in the actual broadcast content itself. Conventional electronic program guides, for example, typically provide information about programming schedules, channel lineups and the like, but do not typically include detailed information about the specific content components of the broadcast, particularly the timing and identities of commercials that may be present in the broadcast stream. Moreover, due to the nature of live broadcasting, it is not always possible to know in advance where the ads will be located in the program stream, or what ads will be run. During a live broadcast of a sporting event, for example, it is very difficult to predict when the commercial breaks will occur, or even how many advertisements will run during the course of the program. It is extraordinarily difficult to predict the actual commercials that will be broadcast before they actually appear in the program stream. This difficultly is compounded by the large number of different channels and programs where an ad may (or may not) appear.

Moreover, the distributed nature of broadcast television makes ad replacement or enhancement technologically difficult to implement. A typical broadcaster or other content distributor source often has many thousands or even millions of subscribers, each receiving their own copies of the broadcast content on their own receiving equipment. Modern television viewers frequently time and/or place shift their viewing using a local or remote storage DVR, thereby leading to thousands (or millions) of separate and distributed copies of the same content, each stored in a different location, and potentially recorded with slightly different parameters (e.g., start and end times). Further, many viewers receive slightly different broadcasts of the same content (e.g., different regional broadcasts), thereby leading to content variations even amongst customers of the same content distributor. These variations amongst the many different copies can make content enhancements (such as ad refreshment) extraordinarily difficult to implement using current technologies. Ad replacement or refreshment is especially difficult after the program has been broadcast when the program is stored in any number of different video recorders that are spread across a wide geographic area.

It is therefore desirable to create systems, device and automated processes to reliably identify and refresh advertisements in television programming even after the content has been broadcast. These and other desirable features and characteristics will become apparent from the subsequent detailed description and the appended claims, taken in conjunction with the accompanying drawings and this background section.

BRIEF DESCRIPTION

According to various embodiments, advertisements in broadcast television programming are replaced with different ads prior to viewing. Replacement can occur in time and/or place shifted content, and can be used to promote a particular advertisement that the viewer has not yet seen, thereby improving the reach of the ad without oversaturation. Various embodiments use data reporting by the playback devices to create a database of viewed ads. This information can be subsequently used to refresh previously-viewed ads, to increase saturation of particular ads, to replace previously-broadcast but no longer relevant ads, and/or for any other purpose. Post-broadcast ad replacement can greatly improve the experience for the viewer while providing a cost-effective technological solution that improves the reach of television advertising. Many additional embodiments and equivalents can be formulated, some of which are set forth below.

One example relates to an automated process performed by a television receiver, media player, video game console or other playback device to replace a digital advertisement in a broadcast television program presented to a viewer by the playback device. The automated process suitably comprises: receiving, at the playback device, content identification data comprising an identifier of an advertisement in the broadcast television program to be replaced; receiving and storing, by the playback device, a replacement advertisement in digital format, wherein the replacement advertisement is selected to be an advertisement that has not been previously viewed by the viewer; monitoring the playback of the broadcast television program to thereby recognize playback of the advertisement to be replaced; and, upon recognizing that the advertisement to be replaced is being played back, the playback device automatically rendering a replacement advertisement instead of the advertisement in the broadcast television program. Other embodiments could relate to playback devices that perform similar processes using digital processing hardware.

Other embodiments relate to an automated process performed by a content management system having at least one processor and non-transitory digital storage to replace digital advertisements in broadcast television programs presented to viewers by remotely-located playback devices. The automated process suitably comprises: receiving, from the remotely-located playback devices via a digital network, data that identifies advertisements viewed by the viewers of the broadcast television programs presented by the remotely-located playback devices; tracking the advertisements viewed by the viewers of the broadcast television programs presented by the remotely-located playback devices in a database maintained in the non-transitory storage; monitoring the database to identify viewers that have not yet viewed a particular advertisement; and transmitting instructions to only those playback devices that are associated with viewers that have not yet viewed the particular advertisement via the digital network, wherein the instructions direct the playback devices to replace one or more advertisements in the broadcast television programs received by the playback devices with the particular advertisement. Additional embodiments could relate to processing systems or devices that perform similar processes using digital processing hardware.

Still further embodiments relate to a data processing system that communicates with a plurality of remotely-located playback devices via a digital media. The data processing system suitably comprises a processor and a non-transitory storage comprising an advertising database. The processor is suitably configured to automatically perform one or more of the automated processes described herein.

Other embodiments relate to other automated processes, systems and devices, substantially as set forth below, as well as their legal equivalents.

BRIEF DESCRIPTION OF THE DRAWING FIGURES

Example embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In various embodiments, data processing systems are used to automatically improve the effectiveness of digital advertisements that are broadcast within television programming through automated replacement of digital content representing identified ads in the program stream. This ad replacement can occur after a program is initially broadcast, particularly when the broadcast program is stored in a DVR for later playback. By identifying ads and then tracking the viewing of the identified ads, it becomes possible to replace ads in certain circumstances, thereby leading to greatly improved ad reach and viewing frequency.

Digital ad replacement can be useful in any number of different scenarios. If a viewer has not yet seen a particular ad, the unseen ad can be automatically "pushed" to the viewer at an appropriate viewing time, thereby boosting the reach of the unseen ad. Conversely, if a viewer has seen an ad more than a desired number of times, a different ad can automatically replace further repeat viewings of the previously-viewed ad, thereby correcting the viewing frequency of the ad and preventing oversaturation or boredom by the viewer. Ads can be automatically provided in a desired viewing sequence, if desired, without regard to the channels or times that the viewer is watching the ads. In other embodiments, outdated ads (e.g., ads promoting broadcasts or sales that occurred after the broadcast but prior to the viewing time) or ads intended for other geographic locales can be automatically refreshed with ads that are more relevant to the current viewing location and/or time. Other functions and features may be considered as well.

In further embodiments, a broadcaster or other aggregator can use digital content recognition to automatically recognize and tag certain ads for subsequent processing as the ads are broadcast. As a playback device encounters a tagged advertisement, it may initially report that the ad has been viewed, and this viewing by that subscriber can be recorded in a database. This viewing database can be used in any number of different ways. If the same ad is subsequently encountered by the same viewer, for example, the repeat viewing can be readily identified so that the previously-viewed ad can be replaced with another ad that is more engaging and/or more relevant to that particular viewer. Tracking and replacement can be performed even if the viewer is time or place shifting the viewing of the ad. Indeed, outdated ads in time shifted content (e.g., for events that occurred after the broadcast, but before the time shifted viewing) can be replaced with more relevant advertising. Ad tracking and replacement can therefore be used to greatly expand the reach and/or frequency of ad viewing across a wide number of viewers who each maintain their own separate copy of the broadcast programming.

Various embodiments use audio fingerprinting or other content analysis techniques to identify the specific contents of a television broadcast. Content analysis can effectively and quickly identify advertisements or other portions of the broadcast stream. Moreover, the identification can be performed while the content is being broadcast or just before the content is re-distributed to the end viewer, thereby allowing identification of the actually-broadcast content at a time when such information can still be used to enhance the viewer experience. This "just prior" identification by a content aggregator can be more reliable and more flexible than prior techniques that relied upon programming schedules or metadata in the program stream.

Further, rapid identification of advertisements further allows any number of beneficial actions to be made based upon the program content. Advertisements or other content can be identified in real time (or near real time, accounting for some delay that is inherent in digital processing, storage and transmission) as the content is broadcast, in some implementations. The identification can recognize the same ads even when they are run on different channels, networks, programs and/or television markets, thereby providing a very comprehensive and useful database of information. This database could be used, for example, to track some or all of the ads run across a national (or even international) advertising campaign that spans multiple channels, programs and television markets. Similar constructs could be used to automatically and simultaneously track local ads run in one or more markets. The resulting database could therefore present an accurate and timely listing of a large number of ads for any number of different advertisers that are run across a variety of channels, programs and networks across a large number of television markets.

Additionally or alternatively, additional data about the ads contained in a viewed program stream may be distributed to viewers in real time or otherwise to supplement the viewing of a live or recorded broadcast, as desired. Certain advertisements could be supplemented, for example, with links to purchase sites or to additional information about the product being advertised. Other embodiments could enable second screen applications (e.g., games or other features played on a smartphone, tablet, remote control or other device) related to the content that the viewer is watching. Still other embodiments could use the information obtained from the audio fingerprinting to skip over the ads in a broadcast, to prevent skipping over the ads (e.g., by disabling trick play while the ads are being broadcast), to replace the ads with other content, or to perform any other actions as desired. Even further, the information obtained from the content analysis may be stored with electronic program guide (EPG) or other content management data that can be shared with other services that process the received content, such as placeshifting, time shifting or the like. Even further, identified content can be used to track time and/or placeshifted playback, and/or to replace ads as appropriate for live viewing and/or for time and/or placeshifted playback. These and other examples are described more fully below.

Figure 1:
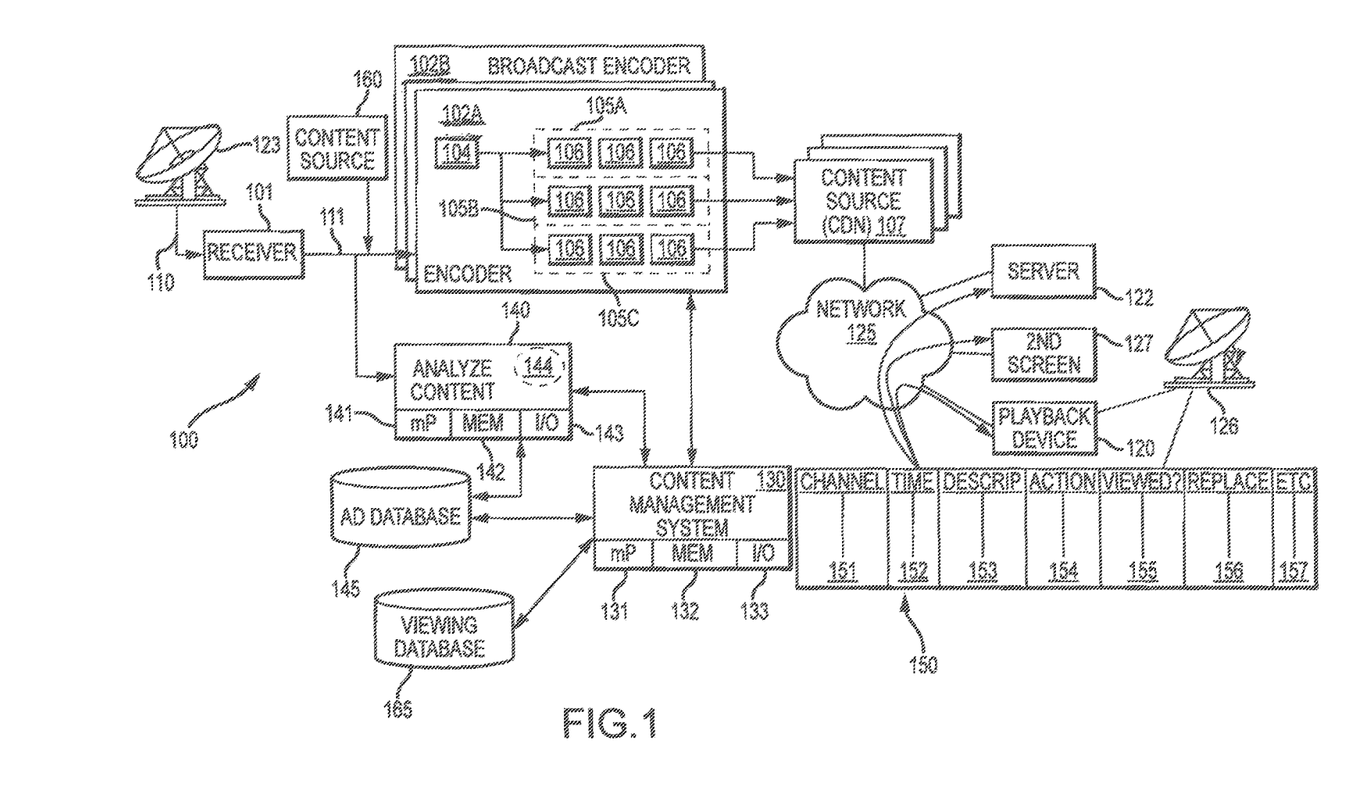
FIG. 1 is a block diagram showing one example of a system for gathering and processing information about a broadcast media stream using content analysis.

Turning now to the drawing figures and with initial reference to FIG. 1, an example data processing system 100 to identify and augment the contents of a broadcast television stream 110 suitably includes a receiver 101, a content identification system 140 that maintains a content database 145 and a content management system 130. Each of these components may be provided by a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in redistributing the received content, as desired.

In various embodiments, television signals 110 for one or more networks, channels or the like are received in any format by the system operator via satellite 123, fiber optic or any other conventional wireless or physical media for transmitting television signals. The signals are received, demodulated and decoded as needed by any appropriate receiver(s) 101 to extract program signals 111 that represent the decoded television program stream. Alternately or additionally, content may be received directly from a broadcaster, distributor or other source 160, as desired.

The extracted programming signals 111 are analyzed as appropriate to identify the program contents. In the example of FIG. 1, audio portions of the extracted signals are analyzed by an audio analysis system 140. Audio analysis system 140 is any computer system that is capable of analyzing audio contents from the decoded signals 111 to recognize advertisements or other portions of the underlying content. To that end, analysis system 140 typically includes any conventional processor 141, memory 142 and input/output interfaces 143 that would be commonly found on a server or similar computer system to access networks, mass storage and/or the like. Analysis system 140 could be equivalently implemented using cloud-based computing resources, as desired.

In most embodiments, the analysis system 140 executes a software application 144 that performs the analysis based upon the audio and/or video content received. In various embodiments, analysis considers average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Various examples of automatic content analysis software based upon audio and/or video data processing techniques are commercially available from Audible Magic Corporation, the Caipy corporation, and/or any number of other sources. Many different audio and video fingerprinting or other automated analysis programs could be used in any number of other embodiments.

The extracted content data may be compared to data previously stored in a database 145, as appropriate, to identify portions of content in the program stream. Commercials, for example, can be recognized when the audio portions of the program stream 111 contain similar data to known audio data stored in database 145. Database 145 may make use of conventional database software (e.g., database products available from Microsoft, IBM, Oracle, MySQL, SAP and/or any other vendor), or the database 145 may be a custom database developed to store content recognition data, as desired. Database 145 may reside on the same computing hardware as system 140, or separate computing resources could be provided, including any sort of cloud-based computing resources.

Typically, analysis application 144 initially recognizes scene changes in the underlying content. When a different scene is identified in the analyzed media stream, application 144 attempts to recognize the scene based upon digital analysis of the audio and/or video. If the scene already exists in database 145, then a new occurrence of the recognized scene can be recorded in database 145 or elsewhere. If the scene is not recognized, then a new entry in database 145 may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content processing system 140 is therefore able to identify advertisements or other contents of the received television broadcast 111 though analysis of the underlying audio or video content.

In many implementations, content identification is performed in parallel for multiple channels that may be simultaneously received for content aggregation, for collection of advertising data, or for any other purpose. A distributor/aggregator, for example, may encode the extracted signals 111 for distribution on a digital network, for aggregation and redistribution of signals 111 over a DBS or cable distribution system, for generating content stored on a remote storage digital video recorder (RSDVR) or video on demand (VOD) service, or for any other purpose. Content identification could be performed while the content is being processed for redistribution. Alternately, content could be stored for subsequent analysis, as desired.

In the example of FIG. 1, content analysis occurs in parallel with the encoding of the live broadcast signals 111 for adaptive streaming on a digital network 125 and/or for broadcast via cable, direct broadcast satellite, terrestrial broadcast, and/or the like. Encoder 102B, for example, can be used to encode signals 111 into a suitable format for broadcast via cable, DBS, or the like. Such broadcasts may be ultimately received by playback devices 120 via broadcast system 126 or the like. In the adaptive streaming example illustrated in FIG. 1, an encoder 102A suitably encodes programs 104 contained within signals 111 into one or more adaptive streams 105A-C each representing a media program 104 in its entirety, but with different bit rates, frame rates, resolution and/or other levels of quality. Typically, each stream 105A-C is made up of smaller segments 106 that each represent a small portion of the program content with a single data file. Each stream 105A-C is typically encoded so that segments 106 of the different streams 105A-C are interchangeable with each other, often using a common timing index. This allows a client media player to mix and match segments 106 from different streams 105A-C to create a media stream that effectively adapts as network conditions or other conditions change.

The adaptive streaming example of FIG. 1 shows sets of segments 106 making up each stream 105 being stored on a content delivery network (CDN) or other content source 107 for distribution on the Internet or another network 125 as part of an RSDVR, VOD or other media streaming service. Typically, a media player application executing on one or more playback devices 120 contains intelligent logic to select appropriate segments 106 as needed to obtain and playback the media program 104. Segments 106 may be interchangeable between streams 105 so that higher quality segments 106 are seamlessly intermixed with lower quality segments 106 to reflect changing network or other conditions in delivery over network 125. Since the segments 106 are typically stored as separate files, segment requests may take the form of conventional hypertext transport protocol (HTTP) constructs (e.g., HTTP "get" instructions) or the like. Such constructs are readily routable on network 125 and can be served by conventional CDN or other web-type servers 107, thereby providing a convenient mechanism for distributing adaptive media streams to a variety of different client devices on network 125.

Again, other embodiments may use different encoders 102A, 102B, etc. for encoding cable television signals, DBS signals, or the like; still other embodiments may omit the encoding function entirely and perform audio analysis or other content recognition separately from the distribution function. Since many distributors already receive program signals 110 for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be rebroadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Various embodiments may realize substantial benefits by integrating the identification information obtained from content recognition into content management data. As noted above, content recognition may be performed in real time (or near real time, accounting for inherent delays in data processing, communications and the like) as the program streams are received, thereby allowing for very rapid identification of then-current broadcast content. This information may be readily incorporated into electronic program guide (EPG) data or other content management data that is provided to the television receiver or other playback device.

Content management system 130 shown in FIG. 1 is a computer system that has any conventional processor 131, memory 132 and input/output interface 133 features commonly associated with data processing systems, including any sort of cloud-based resources. Many content aggregators currently use content management systems 130 to manage and distribute electronic program guide (EPG) data and other information about the programs that are distributed within system 100. These systems 130 may be expanded to process information relating to advertisements or other portions of the content stream, to associate actions to be performed by the viewer and/or the playback device based upon the content of the stream, and/or for any other purpose.

FIG. 1 shows an example of data 150 that could be maintained by content management system 130. As shown in the figure, data 150 could include channel information 151 and timing information 152 about each entry so that the particular content can be readily identified. Other embodiments may use different identification data, such as distributor or network information, or any other information as desired. Although some implementations may incorporate conventional EPG data (e.g., data obtained from a vendor or other source), the example of FIG. 1 uses channel and time so that even portions of a program can be individually identified. Advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

Data 150 as illustrated in FIG. 1 also includes description information 153 and/or action information 154. The description information 153 may simply describe the contents of an identified portion (e.g., "ad", "shoe ad", "Nike ad", "action scene", "Battle for Helm's Deep", etc.) using text or any code. Since the information was obtained from the actual live broadcast itself, it will typically be very accurate in both timing and content, even if programming is delayed or otherwise modified from a predetermined schedule for any reason, and could be used to provide very accurate indexing through the broadcast, for example. Data 150 may also include action information 154 to separately trigger an action by the playback device, as described more fully below. A playback device could, for example, be programmed to replace an ad, to offer a web link to an online shoe retailer whenever a "shoe ad" is run, or to offer additional content, or to take any other action. Data 150 as shown in FIG. 1 is merely an example; other embodiments may be differently organized or encoded, and/or may represent description information 154 and action information 155 in any other manner.

Some or all of data 150 may be provided to any sort of media player, television receiver, network server or other recipient device in any manner for storage and further processing as desired. In various embodiments, data 150 including information obtained from the content analysis is provided as part of EPG information delivered to set top boxes or other television receivers associated with cable, DBS or other distributors 126. Such information may be delivered using a batch delivery, when possible, or in real time (accounting for some delay inherent in data processing and transmission) as desired. Some of all of data 150 may also be provided to media players, television receivers and/or other playback devices 120 via network 125 from, e.g., a network service such as content source 107 or a separate network server 122, as desired. Server 122 may be useful in, for example, providing the content information to a smart phone, tablet or other computer, video game player, remote control device or other "second screen" 127 that may be used by the viewer while he or she is also watching broadcast television. In various embodiments, data 150 could include action data 154 that triggers games, applications, web links or other features accessible using the second screen that are time coordinated to the advertisements or other programming that is currently viewed on a television or other display. Data 150 could be formatted in any manner. In various embodiments, data 150 could include action data 154 and/or identification data as tags or the like in an XML-type format. Again, many other embodiments could incorporate any number of additional or alternate features to take advantage of the real-time identification feature provided by the broadcaster.

Various embodiments also include a database 165 for tracking viewing of identified advertisements. Database 165 may be physically and/or logically combined with ad database 145 in some implementations. Alternatively, viewership database 155 may be physically and/or logically separated from database 145 in any manner; database 165 could be maintained on separate computing hardware, for example, using separate database management software as desired. Although FIG. 1 shows database 165 being implemented as part of content management system 130, equivalent embodiments could implement database 155 as part of content source 107, server 122 and/or any other service, as desired.

Viewing database 165 suitably maintains additional data 155-157 to track actual viewing of identified advertisements. In the example of FIG. 1, data 155-157 is shown in a combined data structure with data 150 for convenience, although the different fields in data 150 may physically and logically reside in separate locations within databases 145, 165 and/or other separate databases, as desired.

In the example of FIG. 1, each playback device 120 updates database 155 as appropriate to track actual playback of certain advertisements (or other program segments). To that end, data field 155 indicates whether a viewer has actually watched a recognized ad. This indication may be, for example, a binary flag indicating whether an ad has been viewed by a viewer, a count of the number of times that the ad has been viewed, or the like. Data field 155 indicates a replacement ad, if desired, and data filed 156 includes any additional data, such as metadata or other rules indicating whether an ad should be replaced, and/or how the ad replacement should occur. The various rules 157 can be processed by content management system 130, by playback device 120, by content source 107 and/or by any other relevant device to replace a previously-viewed ad (as indicated in data 154) with a different ad indicated within data 156. Again, data 155, 156, 157 may be stored and processed by different devices within system 100, as desired.

Figure 2:
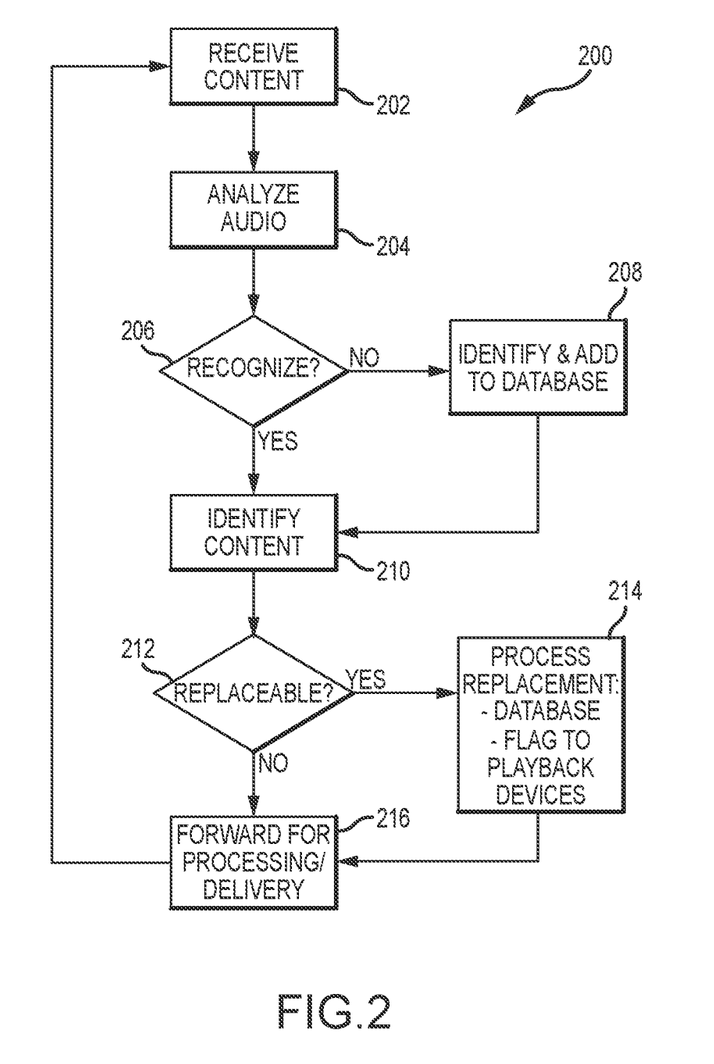
FIG. 2 is a flowchart of an example automated process to identify and manage portions of broadcast media content using content analysis.

FIG. 2 provides additional detail about an example process 200 executable by a data processing system 143 operated by a content aggregator, distributor or the like to identify portions of a television broadcast using automated content analysis. The various functions shown in FIG. 2 may be implement using software that executes on content analysis system 140, database 145, content management system 130 or any other processing resources operating within system 100. The example process 200 may be supplemented or modified to create any number of equivalent implementations.

Referring now to FIG. 2, broadcast television or other content is received (function 202) from the broadcaster, television network, or any other source, and the audio or video content of the received programming is analyzed (function 204) so that digital "signatures", "fingerprints" or other records of the content can be created. As noted above, the analysis may be performed in real time as the programming content is received. Alternatively, content analysis could be performed on stored content, previously broadcast content, or any other content as desired. Content analysis software 144 suitably processes the audio and/or video data to prepare appropriate fingerprints/signatures or other data that can be compared to data of previously-encountered content stored in database 145 (function 206).

If a portion of the content has a fingerprint that cannot be identified from database 145, then alternate identification may occur (function 208). In various embodiments, the content is flagged so that a human operator can observe the unrecognized portion of the content stream. That is, newly-discovered content can be flagged for review by an administrator or any other reviewer who can categorize or otherwise describe the first instance of the observed content. This first recognition process could be automated by using voice or image recognition in some embodiments, or by using any other techniques as desired. As noted above, content identification could be crowd-sourced to any number of paid or unpaid participants, if desired. Alternately, a human operator could recognize the initial content and manually enter descriptive information, as needed. In still other embodiments, the content (or at least the signature data) is provided a priori by the content creator or distributor so that system 140 is able to recognize the content when it is subsequently broadcast. Various embodiments could handle initial content recognition in any other way.

When the new content is recognized, then newly-observed data and its description can be stored in database 145 so that the content will be later recognized if and when it is rebroadcast. A television commercial, for example, may not be recognizable during its first broadcast, but after being recognized the computed data can be used to recognize rebroadcasts of the same ad, even if the rebroadcast takes place on a different channel or network, at a different time and/or in a different broadcast market.

Rebroadcasts of identified content should generate the same (or at least very similar) signatures/fingerprints. When subsequent content analysis 206 identifies the same signature in a subsequent broadcast (function 210), then the portion of the broadcast content used to generate the data can be readily identified based upon information stored in database 145. An advertisement, for example, can be identified and recorded in database 145. The content itself may also be tagged so that further processing based upon the advertisement is possible.

As noted above, real-time recognition enables any number of new actions that could be taken based upon the identified content. In some embodiments, the viewing information is simply collected in database 145 for tracking and further analysis. Other embodiments could additionally or alternately tag the content itself, as desired. For example, any number of different actions (function 212) could be triggered with one or more identified portions of the content. If an advertiser has requested replacement and/or additional content to be associated with a particular ad, for example, then data 150 can be updated whenever the ad is broadcast to reflect that an actionable ad is occurring in the live stream (function 214). Actions may be tagged or otherwise triggered in any number of other ways.

In various embodiments, updating of advertisements can occur initially determining whether a recognized ad is potentially replaceable (function 212), and if so, performing additional processing 214 to begin tracking actual viewing in database 165, and to tag the ad so that playback devices 120 can perform tracking and/or replacement as described herein. In various embodiments, tracked ads are tagged with metadata to prompt additional actions by the playback devices 120. The additional actions may include updating database 165 as the tagged ad is actually viewed, replacing the tagged ad as instructed by further logic in data 157 or the like, and/or taking other actions as desired.

The identification information 150 that is obtained from process 300 may be forwarded to content management system 130, servers 107 or 122, playback devices 120 and/or any other destinations as desired (function 216). Data 150 may be delivered via a cable or DBS broadcast system, for example, as batch or real-time out-of-band content similar to EPG data. Alternately, data 150 may be stored with the content itself, as in an RSDVR or VOD system, or in an MPEG structure, and/or the like. Content and data 150 may be otherwise transmitted to a playback device 120 and/or second screen 127 via network 125 or in any other manner as part of function 216.

Figure 3:
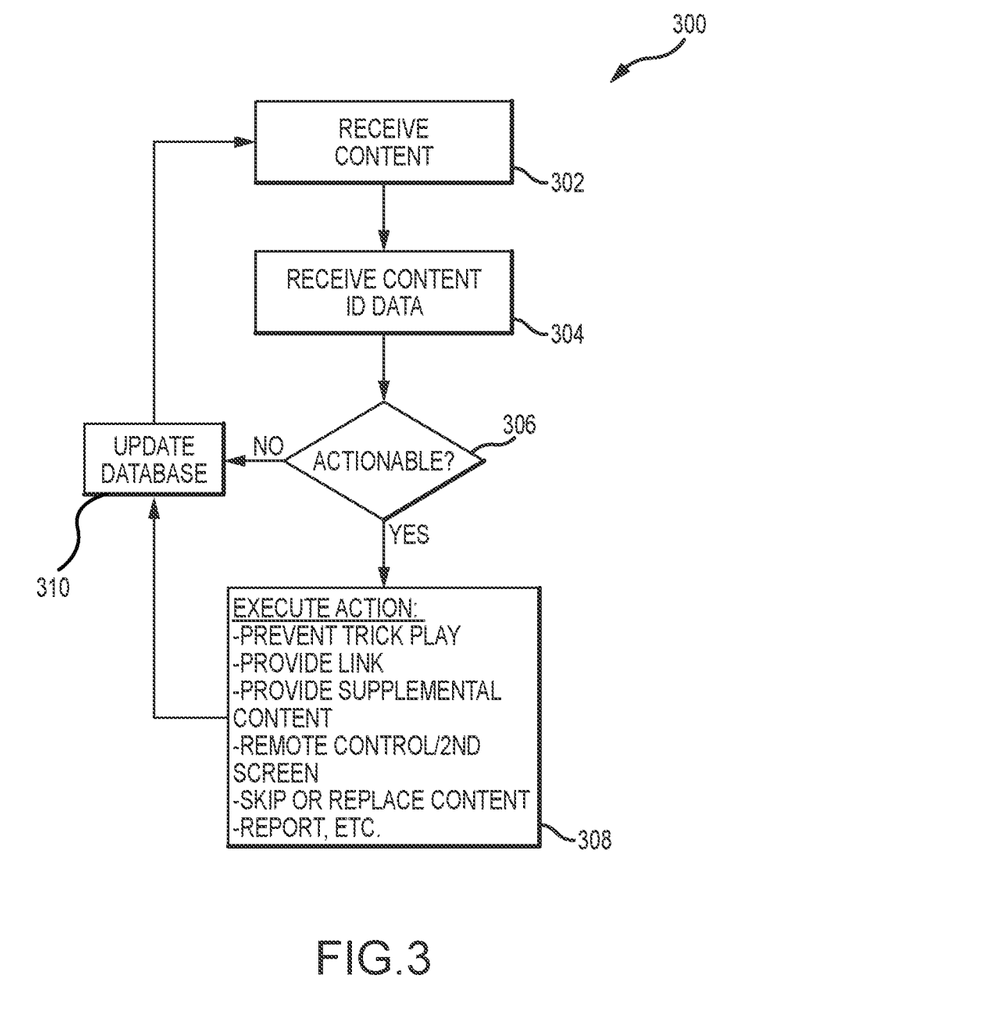
FIG. 3 is a flowchart of an example automated process executable by a client device to process actionable content in a broadcast television stream.

FIG. 3 shows additional detail about an example process executable by a media player, television receiver or other playback device 122 to track and replace identified content in a television broadcast.

The playback device 120 initially receives the television broadcast stream or other content (function 302) from a terrestrial or satellite broadcast, a cable television connection, or any other source. The playback device 120 also receives some or all of the information 150 identifying advertisements or other portions of the broadcast (function 304). As noted above, the information 150 may be provided with the broadcast content (e.g., as associated EPG data, as part of an MPEG or similar media package, and/or otherwise via the same cable, DBS, terrestrial broadcast or other source). Information 150 may be equivalently obtained separately from the content (e.g., from a server 107 or server 122 on network 125) if desired.

The receiving device 120 monitors data 150, as appropriate, to identify any actionable events that may occur during the viewer's programming (function 306), such as any ads that are being tracked. If an actionable item is identified on a channel and time that is being actually by the viewer, then the playback device suitably executes the requested action (function 308). The action may be, for example, transmitting a message via network 125 to the content management system 140 to update database 165, and/or to take any additional actions as desired. Further actions may include performing an ad replacement, as desired. In such cases, receiving device 120 replaces the tracked ad with another ad that is obtained from any source. Ads may be obtained as needed via a service accessible to device 120 via network 125, for example; equivalently, replacement ads may be cached at device 120 prior to the ad replacement to minimize latency. Other embodiments may operate in any other manner, and many examples of ad replacement techniques and processes are described herein.

Several examples of other actions 308 that could be executed are described herein, and many others could be formulated across a wide array of alternate embodiments. Function 308 could represent any number of different actions performed by different types of devices 120, as desired. These examples presented herein are not intended to be limiting.

In various embodiments, the data 150 identifies any commercials in the broadcast stream so that trick play (e.g., fast forward) can be disabled while the commercials are playing. To implement this, the playback device 122 would simply ignore or otherwise refuse to execute a fast forward or similar instruction during the times of the broadcast that are identified as containing commercials. Trick play could also be disabled for only certain ads, as desired, so that only certain advertisers are allowed to prevent viewers from fast forwarding over their commercials. This concept could be expanded and/or commercialized in any number of ways.

Conversely, if the precise times of the commercials in a broadcast stream were identified using data 150, then playback device could use this timing information 152 to skip over the commercials entirely, or to replace the commercials with other content as desired. Such replacement could be used, for example, to replace an ad that is of relatively low interest to the viewer (e.g., an ad that has been previously viewed) with an ad that is of higher interest based upon viewing history, demographic information, customer profile data available to the playback device 120, and/or any other information as desired. Ads that are time or location sensitive could also be replaced with different ads that are more relevant to the then-current viewing conditions, as described more fully below.

Note that supplemental content (including replacement ads, other audio/video content, and/or the like) or other data 150 associated with identified content may be stored along with recorded programs in a DVR or other storage of receiver 120 so that ad replacement or other supplemental effects could still be performed even during time-shifted playback. If the supplemental content relates to a web address or other content that is displayed on the primary or second screen, for example, the supplemental content could still be triggered even when the content is time shifted to a later playback time. Similarly, the supplemental content could be placeshifted with a video stream to another playback device 127 for viewing at a different location. Supplemental content may be otherwise transferred for viewing along with the primary content as desired. Ad tracking and replacement can also be performed for time and/or place shifted viewing, as desired.

In still other embodiments, the playback device 120, 127 could supplement identified content with links and/or additional content. Since an advertisement or the like is identified using content from the ad itself, the supplemental content could be readily linked to all of the ads belonging to a product class or relating to a particular advertiser, regardless of the time, network or channel that broadcasts the ad. This would allow, for example, an advertiser to supplement all of the ads for some or all of their products with additional features on the playback device 120 regardless of the content of the ad, the broadcast network, or the time of broadcast. If an advertiser wanted to display a logo on a second screen and/or provide a link to its webpage while any of its ads were played, for example, data 150 could instruct such actions for any ads that are associated with that advertiser. The playback device 120 (or second screen 127) would then interpret the data 150 whenever an ad for that advertiser was presented, and would respond appropriately to take the instructed action. A link to a retail site could be provided during an ad, for example, so the viewer could simply click on a button or execute a similar feature to purchase the advertised product. Additional content (e.g., a longer ad, a movie, a game or the like) could also be provided so if the viewer wanted more information about the advertised product, he or she would be able to obtain it immediately and conveniently. Further, since data 150 is associated with the programming itself, the requested action could be performed whenever and wherever the content is played for the viewer, even if the content is place or time shifted.

As noted above, additional content could additionally or alternately be provided via a secondary device 127, as desired. The secondary device 127 may receive information 150 in addition to or in place of the playback device, as desired for the particular application. Any other content could be provided in addition or in alternative to that described here, and such content could be provided in any manner. This could provide a significant benefit to advertisers, who may want to supplement their broadcast ads with additional content and/or to target their additional content toward certain viewers.

As noted above, advertising or other content can be replaced, as desired. If a viewer has already viewed an advertisement more than a threshold number of times, for example, then the player device 120 may request a replacement ad for the same timeslot. In other embodiments, certain ads recorded as part of the original broadcast may no longer be relevant if the program has been recorded and has not yet played back for some time. Ads for soon-to-be-broadcast television programming, for example, may be irrelevant after the advertised program has already been broadcast. Player device 120 may be able to request a replacement ad so that outdated ads in stored (e.g., timeshifted) programs are replaced with more current advertisements (e.g., ads for programs that still have not been broadcast, or for different products, services or programming altogether).

In another example, local ads could be replaced when the viewer has placeshifted viewing to a different location where the local ad is no longer relevant. If a viewer located in Colorado is viewing a placeshifted stream of a Utah broadcast, for example, various embodiments would allow the playback device 120 (and/or second screen device 127) to recognize Utah-centric ads in the placeshifted stream, and to replace the Utah ad with a more appropriate local ad (or a national ad) for the viewer's current locale. Other embodiments could replace ads in live broadcasts, delayed broadcasts, or in programming that has been shifted in place or time in any manner.

Processing of logic in data 157 to perform ad replacement can occur at any place and time, as desired. Various embodiments provide data 155-157 directly to playback devices 120 to allow local processing of ad replacement. Although many implementations will also update a remotely-located database 165 to permit centralized analysis of ad viewing (function 310), this is not required. Other embodiments may perform the ad replacement process using content source 107, and/or content management system 130, as described below. To that end, ad replacement logic 157 may be executed by any processing hardware within system 100 to identify a previously-viewed ad (data 155) and replace it with a different ad (data 156), as desired.

Replacement content may be obtained in any manner. In one example, replacement ads are obtained by the player device 120 processing URLs or other identifiers associated with the identified ads. Such identifiers may be delivered with the supplemental content as described herein, and may be processed by the playback device (e.g., device 120 and/or second screen 127) to obtain supplemental content or further instructions from the content management system 130 or another content source 107, as desired. The playback device 120 and/or second screen device 127 is then able to receive data and/or instructions from the content management system 130 to replace ads, or to take other actions as described herein.

In still other embodiments, replacement ads can be identified on an a priori basis based upon viewing history, demographics and/or any other factors, and replacement ads can be stored in advance at the viewer's playback device 120 for immediate replacement as needed. That is, if an ad is to be "pushed" to a viewer, the ad can be stored at the playback device 120 in advance so that the device 120 can locally process the ad replacement when a suitable ad (e.g., an ad that is eligible to be replaced) occurs in the viewing stream, as indicated by data 150. In such embodiments, the viewing device simply waits for the viewer to initiate viewing of an ad that is eligible for replacement, and then renders the previously-stored ad in place of the ad in the view stream. Playback device 120 will typically report the ad replacement with to viewing database 165, as desired.

Figure 4:
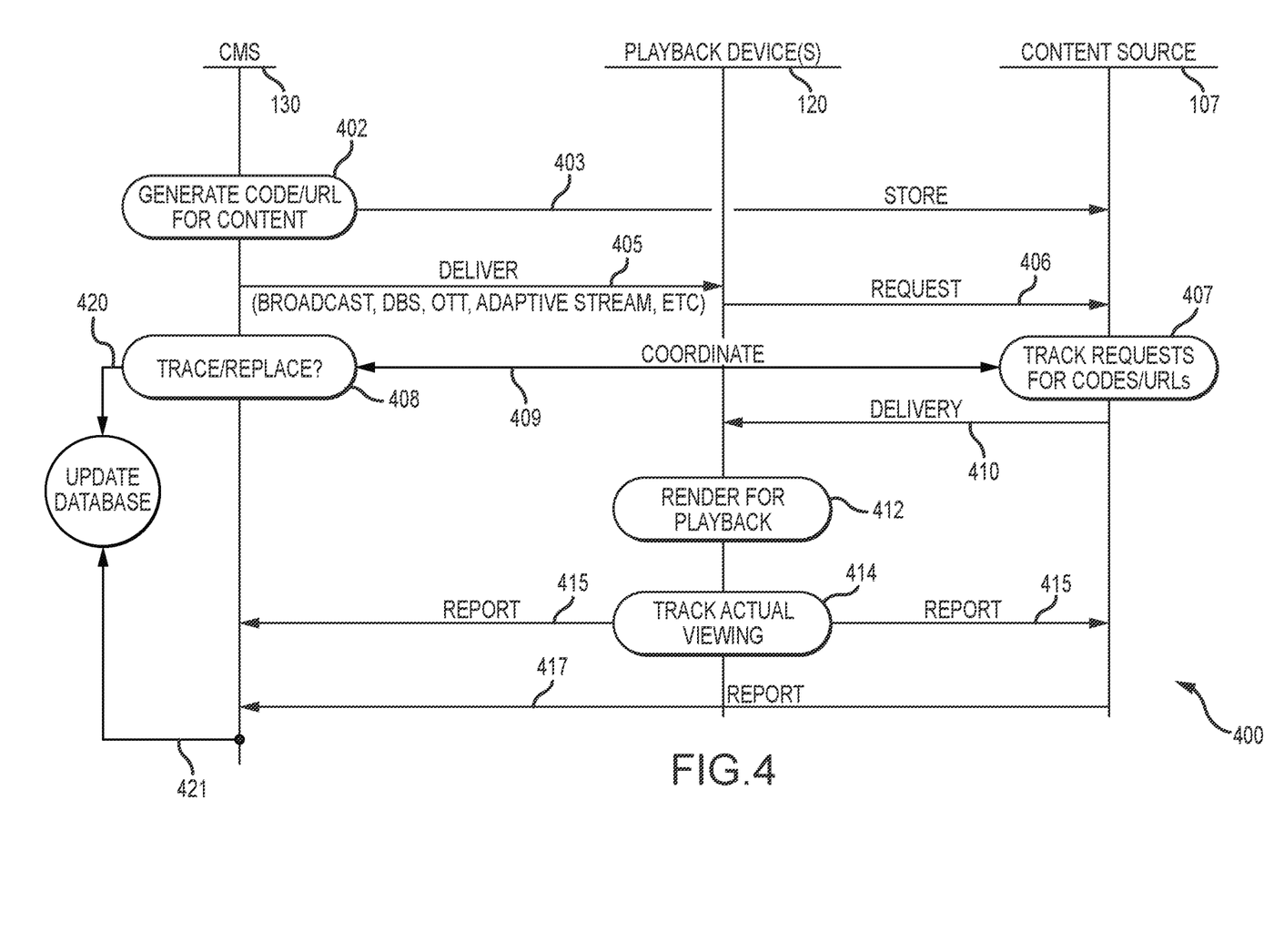
FIG. 4 shows an example of an automated process to deliver, monitor and update advertisements.

With reference now to FIG. 4, one example of an automated process 400 for delivering, replacing and/or tracking ads (or other content) is shown. In the example of FIG. 4, a content management system 130 or other data processing system generates identifiers (function 402) for ads that are delivered to viewers via a CDN or other content source 107, as described above. These identifiers 402 may be initially stored in database 150 or the like. Identifiers 402 may be any sort of digital identifiers, including any sort of unique alphanumeric or other codes that uniquely identify the various ads available for tracking within the system.

In various embodiments, the identifiers are uniform resource locators (URLs) that uniquely identify the ad to a CDN, or to any other content source 107. In such embodiments, identifiers 402 are shared between content source 107 and content management system 130 (function 403) as desired. The identifiers/URLs are then distributed to media players, television receivers and/or other network-enabled playback devices 120 as described herein (function 405). Identifiers may be distributed with EPG data provided as part of a cable, satellite or terrestrial broadcast, for example. Other embodiments could distribute identifiers as part of a digest or other metadata accompanying an adaptive or other media stream, such as an over-the-top television stream, a placeshifted media stream, a stream from an RSDVR or VOD service, and/or the like, as described above. Still other embodiments could deliver the identifiers using a separate server on the Internet or a similar network, or in any other manner.

The media client, television receiver or other playback device 120 uses one or more identifiers to request advertisements from the content source 107. As noted above, various embodiments could use URL type identifiers to request advertisement data using conventional HTTP constructs, or the like. Note that content source 107 need not be the same source for the underlying programming. The program stream may be received via DBS or cable, for example, or from a separate service 107 on 125, even though ads are served though source 107.

Requests 406 for supplemental information could occur on any temporal basis. For example, the requests 406 could be triggered at the time that the identified media content is played back, even if the content has been time and/or place shifted. Other embodiments could trigger requests 406 as the content is received or stored, thereby allowing for caching of supplemental content for offline viewing or other purposes as appropriate.

Content source 107 receives the requests 406 received for particular ads (function 407), and responds accordingly. In various embodiments, the requests 406 identify the viewer and/or playback device 120, as well as the ad that is about to be presented. Content source 107 may simply respond with the requested ad. In further embodiments, content source 107 communicates (function 409) with content management system 130 (or another appropriate service) via network 125 or the like to update viewership database 165. To that end, the request 406 received from the playback device 120 serves as an indication that the tagged ad is being viewed, or is about to be viewed.

Content management system 130 responds to the communications 409 from the content source 107 as appropriate (function 408). In various embodiments, content management system 130 simply updates viewership database 165, as appropriate (function 420) to track the number of times that the particular viewer (or at least the particular playback device 120) has viewed/encountered the identified ad.

Further embodiments of function 408 may implement logic 157 or the like to further determine whether to replace the ad provided to the viewer. If the viewer has previously watched the ad more than a threshold number of times, for example, it may be desirable to provide a different ad. Similarly, if the ad is no longer relevant (due to the time elapsed since broadcast, or a placeshifted location of playback, and/or any other factors), a more relevant ad can be presented in place of the broadcast ad. If a replacement ad is preferred, then content management system 130 suitably provides a return instruction via communications 409 to content source 109 that directs content source 109 to serve a different ad. The replacement ad may be indicated in metadata (e.g., data 156 or the like) or elsewhere as appropriate. Equivalent embodiments could perform functions 408 and 420 by the content source 109, if desired.

In various embodiments, requests 406 may be additionally or alternately tracked in conjunction with time data, client ID data, location data or the like. This allows content source 107 or another data processing system to monitor demand for a particular ad, and/or for any other purpose. Such demand may be tracked over time to identify times of high or low demand, to identify times and frequencies of place or time shifting, to identify playback locations for more appropriate local ads, to identify types of clients/users who are placing requests for the ad, and/or for any other purpose. To that end, even if identifiers 402 are URLs that can be processed to contact server 107 during playback of identified content, it is not necessary that the identifiers 402 request a particular ad, or ad content at all. It may be beneficial to simply track the times (and source locations) of requests 406 that are posited by various playback devices 120 and 127, since these requests are highly indicative of time and place of playback.

Content source 107 delivers advertisements to the playback devices 120 (function 410). The ads that are delivered may correspond to the original ads requested and/or any replacement ads, as desired. As noted above, content source 107 processes the URLs, tags or other identifying information contained in requests 406 to provide advertisements as described herein. Advertisements may be delivered in file formats, streaming formats (e.g., adaptive streaming formats) and/or otherwise, as desired.

Additional information could be determined through reverse geolocation of the requesting client's IP address or the like to determine rough geographic location of the requesting client, thereby allowing the system to track which ads are more or less popular in certain geographic regions. Other information may be logged, tracked and/or otherwise processed, as desired. The CDN/content source 107 is therefore able to track requests for particular ads that are delivered to the different media clients (function 410) for playback by the media client (function 412). Playback 412 may take place via a locally-attached television, monitor or similar display, although equivalent embodiments could place shift an encoded media stream to a mobile phone, tablet or other remotely-located device (e.g., device 127 or the like).

Time and/or place data associated with requests 406 may be recorded by content source 107 or the like for any purpose. In various embodiments, it may be helpful to track the times that identified scenes are actually played back by the various devices 120/127, since this information is very helpful in allowing broadcasters and advertisers to track the amount of timeshifting and/or place shifting that is occurring. Network requests 406 may also be indicative of the number of viewers who are actually watching the ad, as opposed to the number of viewers who simply record the program (without watching it), or who skip over the ads during playback. This information may be reported back to the content source 107, management system 130, to a separate server 122 on network 125, and/or to any other recipient as desired (function 417) to update viewership database 165 (function 421).

Further embodiments could additionally or alternately track the actual viewing of ads by the media client, receiver or other playback device 120. In such embodiments, the playback device 120 tracks and reports back to database 165 or another database hosted by media source 107, content management system 130 and/or any other network service 122 to indicate which ads were rendered to the viewer (function 414). Ads may be identified by the identifiers described above, or using any other information. In various embodiments, identifiers for the ads are delivered in band or out of band with the content, so the player device 120 simply tracks the identifiers of those ads that have been rendered to the viewer. Ad tracking may be reported back to a data collection system in any manner (function 415); batches of reports may be sent on any regular or irregular temporal basis, or data may be polled by the server, for example. This information can be used to update viewership database 165 (function 421). Ad tracking data (ad identifications, playback times, etc.) may be equivalently reported to content source 107, or to any other server 122 operating on network 125. Note that various embodiments are able to report and track actual viewing (or at least presentation) of the particular ad. That is, if a viewer fast forwards over an ad without watching it, then a "view" may not be indicated. Conversely, if a user watches a program more than once, it is possible to supply different ads for the second (and subsequent) viewing rather than repeating the same ads. Moreover, variation in ads may encourage viewers to watch the ads rather than skipping over them, thereby making all of the ads more effective in reaching the intended targets.

The information contained within requests 406 may be stored and analyzed in any manner. In various embodiments, content source 107 tracks requests 406 received from multiple media players 120, 127 to quantify the number of times that the identified advertisement is viewed. As noted above, time or location data associated with requests 406 may also be tracked in database 165 or elsewhere to monitor time or place shifting by the various users. This information may be tracked over time for any number of different users, programs and advertisements to gather a wealth of useful information. Processing of request data 406 may be equivalently performed by content management system 130, by server 127, and/or by any other processing device or system as desired.

The general concepts set forth herein may realize several substantial benefits that were not previously possible. Ad purchases, for example, can be monitored and improved for very greatly enhanced reach and frequency of viewed ads. Rather than continuing to present the same ad to a viewer who has already watched the ad one or more previous times, a fresh ad can be presented in its place. This can allow serializing of ads (e.g., story campaigns in which one ad builds upon a previous ad) while ensuring that only viewers who have seen the previous ads view the subsequent "episodes", even when the ads are viewed in a time or place shifted setting. Similarly, if a campaign includes multiple spots, viewers can be made to watch all of the spots in the campaign before watching any duplicate ads. Ads could be prioritized for immediate playback, or scheduled for playback in a desired order. Many additional features could be formulated in addition to these illustrative examples.

By tracking actual viewership of specific ads and targeting ads specifically to viewers who have not previously seen specific ads, the effectiveness of ad placement and presentation can be greatly enhanced over prior targeting techniques that relied heavily upon demographic viewership data (e.g., what types of people watch certain shows). Ads may still be targeted based upon demographic information, but based upon actual viewership by an actual viewer, rather than based upon demographic traits of average viewers for a program. That is, replacement ads may be additionally selected based upon the demographics, viewing habits or other characteristics of the specific viewer, thereby greatly enhancing the effectiveness of the ad. Further embodiments allow for more optimized pricing for advertisements, since ads can be targeted specifically to viewers who have not previously seen the ad, and without regard to the underlying content being watched. To provide just one example, ads for athletic shoes can be targeted to a viewer who is expected to be interested in sporting products even if that viewer is currently watching a movie, drama or other program that is not related to sports. Targeting ad replacement allows for much more effective advertising campaigns in comparison to simple ad buys for particular programs.

Moreover, the concepts set forth herein can allow for greatly improved reach and efficiency for advertisers. Reach of a particular ad can be improved by "pushing" the ad specifically toward viewers who have not yet seen the ad. By tracking viewership of a particular ad across channels and programs without regard to the source of the ad, those viewers who have not yet viewed that particular ad can be identified and targeted with great accuracy, thereby allowing for greatly increased ad reach. That is, rather than saturating a large number of viewers who have already seen a particular ad in order to reach a small number of viewers who have not seen it, the fewer non-viewers can be specifically targeted without over-saturating the rest of the viewership with the same ad. Automated tracking and targeting of ad viewing can therefore allow a shift in focus from broad exposure to more focused, targeted exposure as an ad campaign progresses in time.

Collected data 150 can also enable a very reliable prediction feature in some embodiments. In some circumstances, it is likely that a viewer will encounter a particular ad through his or her usual viewing schedule. In such cases, it will not typically be necessary to "push" a replacement ad toward that viewer, thereby incurring additional processing and/or costs. If a viewer regularly watches a particular sports event or a particular program, for example, then it may not be necessary to push ads toward that viewer that are expected to occur during the broadcast of that program. If a viewer's history and/or demographics indicate that the viewer is likely to encounter an ad, then replacement can be skipped as desired.

Various embodiments of the prediction feature could further consider stored content in deciding whether to perform an ad replacement. If a program containing the desired ad is already stored on the viewer's DVR, for example, and/or the viewer is expected to watch the program in the relevant future, then replacement can be skipped, or a different ad can be selected, as desired.

Although FIGS. 1 and 4 show a single playback device 120 for convenience, practical embodiments could scale equivalent concepts to any number of different playback devices 120. Indeed, a broadcaster or content aggregator may be able to identify content prior to broadcast so that a large number of devices receiving the broadcast are able to take enhanced actions based upon the identified content. Moreover, by tracking ad requests for a large number of player devices 120, aggregate viewing habits (e.g., place or time shifting habits) can be monitored, thereby providing valuable information. Even further, it can be very helpful for advertisers to track the broadcast as well as the viewing of their various ads across multiple markets, channels or networks. The systems, devices and processes described herein could be readily scaled to deliver identified content, to enhance the viewing of identified content, and/or to collect viewing information for any number of playback devices and systems, as desired. As noted at the outset, it can be a substantial challenge to track ad viewership across thousands (or more) of playback devices, including devices that support time and/or placeshifting. Various systems and processes described herein are able to recognize advertisements that are present within any number of broadcasts and recordings, and to track viewership of the ads even when the viewing is place or time shifted. Moreover, various embodiments are able to update stale or previously viewed ads distributed across a large number of recording devices to improve the viewing experience for a large number of viewers while adding substantial value to the advertiser.

The foregoing discussion therefore considers various systems, devices and processes for real-time identification of advertisements or other portions of television broadcasts or other media content using content analysis. By identifying advertisements or other portions of the content prior to broadcast (or other distribution), a variety of new features can be provided while retaining a high level of accuracy in identifying ads as they are actually broadcast. By capturing the identity of the ads at the initial point of ingestion, the content distributor or other data-gatherer is able to offer any number of useful new features and benefits, several examples of which are set forth herein.

Various embodiments may additionally or alternatively use automated content recognition for other purposes. Automated content recognition may be exploited by a remote storage digital video recorder (RSDVR) system, for example, to reduce the amount of disk space or other media that is used to store customer recordings. In a typical RSDVR implementation, a relatively large number of users share access to a "cloud based" storage system accessible over a network 125 to program recordings. Unlike the conventional local storage DVRs found in many cable at DBS set top boxes, the RSDVR uses shared hardware for storage of user-generated recordings.

Generally speaking, most RSDVRs store many different copies of the same programs, leading to substantial inefficiencies in comparison to video-on-demand (VOD) systems in which one copy of a program is distributed to many different users. That is, many RSDVR systems maintain a one-to-one ratio of program recordings to users due to licensing issues or the like. An RSDVR system will typically store dozens, hundreds or even thousands of different user copies of the same program, thereby consuming a very large amount of disk or other storage space.

In various embodiments, it may be possible to reduce the amount of storage space used by an RSDVR system by recognizing commercials (or other program segments) within the recordings, and replacing at least those portions of the user recordings with a single master recording. This may be possible, for example, due to the availability of licensing agreements with advertisers that may not be available with content providers. That is, an advertiser may be willing to grant express permission to link a single copy of an ad even if the broadcaster of the original content still requires one-to-one copies of recorded programs.

Figure 5:
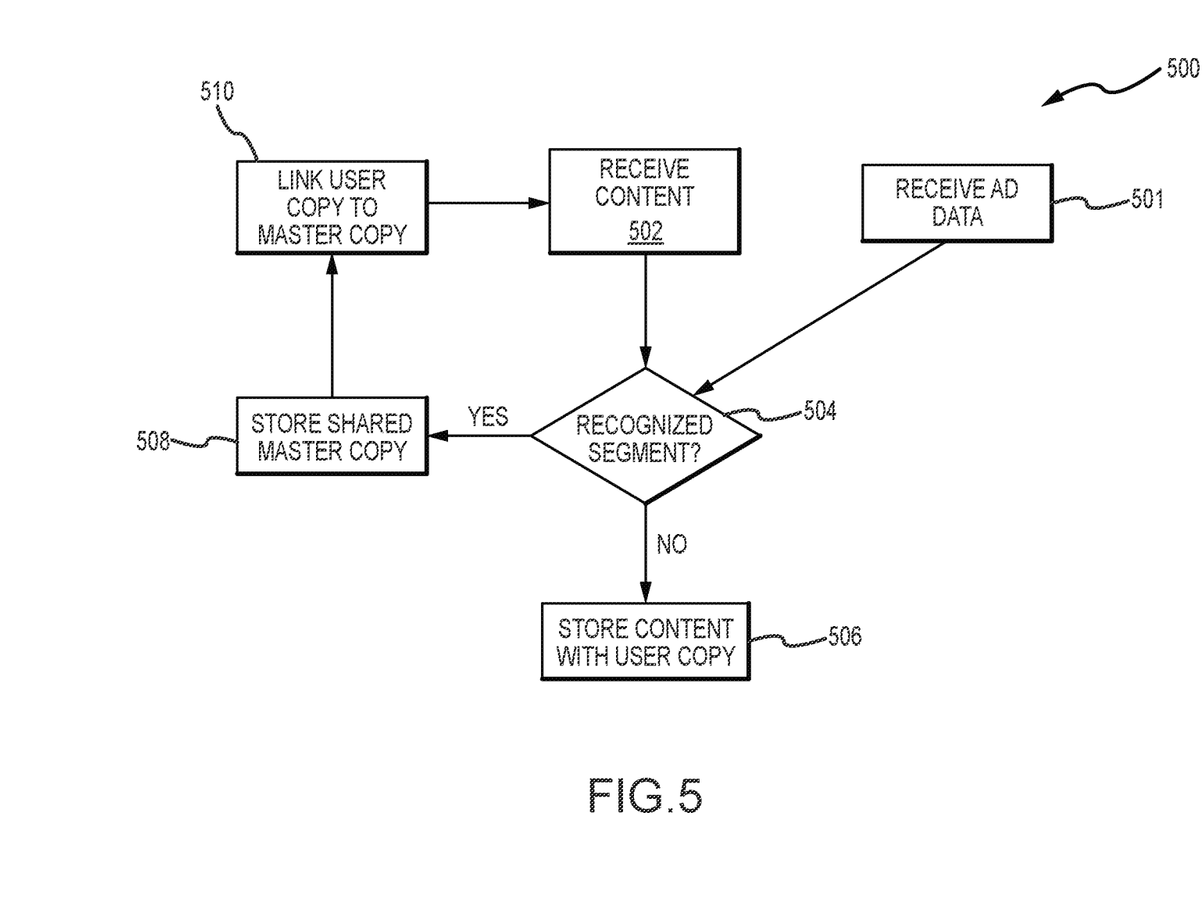
FIG. 5 shows an example to make efficient use of storage space in a remote storage digital video recorder (RSDVR) system.

FIG. 5 is a flowchart of an example process 500 that may be executed by a content source 107 providing an RSDVR system in some embodiments. The various functions of process 500 will typically be executed by processing hardware within the content source 107 based upon computer-executable instructions that are stored in memory or elsewhere.

As shown in FIG. 5, program content (e.g., one or more streams 105) are received from any source (function 502). In various embodiments, content is received from a playback device 120; in other embodiments, playback device 120 simply references content to be recorded, and program source 107 suitably obtains the content from an encoder 102, a cable or satellite source, or another source as appropriate. Data 150 identifying ads in the recorded content may be supplied from the playback device 120 directing the recording, if desired. Equivalently, data 150 about recorded programming may be obtained directly from content management system 130, or any other source as desired (function 504).

The RSDVR system suitably recognizes one or more segments of the program recording based upon the identification data 150 (function 504). Much of the content received will be stored in the user-specific copy, as in a conventional RSDVR (function 506).

For advertisements or other content that are recognized for separate storage based upon data 150 (function 504), however, the recognized portions can be skipped in the user-specific copy, and instead maintained in one or more master copies. That is, the master copy can be maintained in place of multiple user copies of the same content, thereby providing an efficiency not typically found in a conventional RSDVR.

The master copy of the recognized content is linked to each user copy, as appropriate (function 510). In various embodiments, the link is maintained metadata associated with an MPEG structure, although equivalent embodiments could use other forms of metadata, including XML tags or the like.

By providing a single master copy of recognized content, the amount of disk or other storage consumed by the RSDVR can be substantially decreased. Often, ad breaks will consume thirty percent or more of a program broadcast, and therefore an equivalent amount of disk storage when the broadcast is recorded. By allowing the ads to be referenced from a master copy rather than duplicated across a large number of substantially identical copies, a substantial amount of storage space can be conserved. Process 500 may be implemented independent of the other features described herein, if desired.

The general concepts set forth herein may be adapted to any number of alternate but equivalent embodiments. The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a content management system having at least one processor and non-transitory digital storage to replace digital advertisements in broadcast television programs presented to viewers by remotely-located playback devices, the automated process comprising:

receiving, from the remotely-located playback devices via a digital network, data that identifies advertisements previously viewed by the viewers during playback of the broadcast television programs presented by the remotely-located playback devices, wherein the remotely-located playback devices receive the broadcast television programs from a content source other than the content management system;

tracking the advertisements viewed by the viewers of the broadcast television programs presented by the remotely-located playback devices in a database maintained in the non-transitory storage;

monitoring the database to identify viewers that have not yet viewed a particular advertisement in the broadcast television programs; and transmitting instructions via the digital network to only those playback devices that are associated with viewers that have not yet viewed the particular advertisement in the broadcast television programs, wherein the instructions direct the playback devices to replace one or more advertisements in the broadcast television programs that were previously received from the content source with the particular advertisement that has not yet been rendered by that playback device during playback of the broadcast television programs received from the content source.

2. The automated process of claim 1 wherein the data transmitted by the remotely-located playback devices identifies advertisements in time-shifted playback of the broadcast television programs presented by the remotely-located playback devices.

3. The automated process of claim 2 wherein the remotely-located playback devices respond to the instructions by replacing the one or more advertisements in the time shifted playback of the broadcast television programs with the particular advertisement.

4. The automated process of claim 3 further comprising the content management system providing digital media content that encodes the particular advertisement to the playback devices, wherein the digital media content that encodes the particular advertisement is delivered to the playback devices for storage by the playback device after the broadcast and recording of the broadcast television programs but prior to the time shifted playback of the broadcast television programs.

5. The automated process of claim 1 wherein the previously-stored replacement advertisement is rendered by the remotely-located playback device for watching by the viewer as an uninterrupted portion of the previously-broadcast television program at a regular viewing speed.

6. The automated process of claim 1 further comprising assigning a digital identifier to the advertisements in the broadcast television programs, wherein the data reported by the remotely-located playback devices comprises the digital identifier, and wherein the database is organized according to the digital identifier.

7. A data processing system that communicates with a plurality of remotely-located playback devices via a digital media, the data processing system comprising a processor and a non-transitory storage comprising an advertising database, wherein the processor is configured to automatically:

receive, from each of the remotely-located playback devices via the digital network, data that identifies advertisements viewed by the viewers of broadcast television programs presented by the remotely-located playback devices, wherein the remotely-located playback devices receive the broadcast television programs from a content source other than the data processing system;

track the advertisements viewed by the viewers of the broadcast television programs presented during playback by the remotely-located playback devices in the database;

monitor the database to identify viewers that have not yet viewed a particular advertisement in the broadcast television programs; and transmit instructions via the digital network to only those playback devices that are associated with viewers that have not yet viewed the particular advertisement in the broadcast television programs, wherein the instructions direct the playback devices to replace one or more advertisements in the broadcast television programs received from the content source with the particular advertisement that has not yet been viewed during playback of other broadcast television programs received from the content source.

8. The data processing system of claim 7 wherein the data transmitted by the remotely-located playback devices identifies advertisements in time-shifted playback of the broadcast television programs presented by the remotely-located playback devices.

9. The data processing system of claim 7 wherein the digital media content that encodes the particular advertisement is delivered to the playback devices for storage by the playback device after the broadcast and recording of the broadcast television programs but prior to the time shifted playback of the broadcast television programs.

10. The data processing system of claim 7 further comprising assigning a digital identifier to the advertisements in the broadcast television programs, wherein the data reported by the remotely-located playback devices comprises the digital identifier, and wherein the database is organized according to the digital identifier.

11. The data processing system of claim 7 wherein the previously-stored replacement advertisement is rendered by the remotely-located playback device for watching by the viewer as an uninterrupted portion of the previously-broadcast television program at a regular viewing speed.

12. A playback device that communicates with a remotely-located data processing system via a digital network, the playback device comprising a processor and a non-transitory storage, wherein the processor is configured to automatically:

receive broadcast television programs for playback to a viewer of the playback device from a content source other than the remotely-located data processing system;

transmit, to the remotely-located data processing system via the digital network, data that identifies advertisements presented by the playback device during playback of the broadcast television programs received from the content source to thereby permit the remotely-located data processing system to track the advertisements presented by the remotely-located playback device in a database and to monitor the database to identify a particular advertisement in the broadcast television programs that has not yet been presented by the playback device;

receive instructions via the digital network from the remotely-located data processing system directing the playback device to replace one or more advertisements in the broadcast television programs received from the content source with the particular advertisement that has not yet been presented by the playback device; and replacing the one or more advertisements with the particular advertisement that has not yet been presented by the media playback device during playback of the broadcast television programs received from the content source.

13. The playback device of claim 12 wherein the data transmitted by the remotely-located playback devices identifies advertisements in time-shifted playback of the broadcast television programs presented by the playback device.

14. The playback device of claim 12 wherein the digital media content that encodes the particular advertisement is delivered to the playback device for storage in the non-transitory storage after the broadcast and recording of the broadcast television programs but prior to the time shifted playback of the broadcast television programs.

15. The playback device of claim 14 wherein the particular advertisement previously stored in the non-transitory storage is rendered by the remotely-located playback device for watching by the viewer as an uninterrupted portion of the previously-broadcast television program at a regular viewing speed.

16. The playback device of claim 12 further wherein a digital identifier is assigned to the advertisements in the broadcast television programs, wherein the data reported by the playback device comprises the digital identifier, and wherein the database of the remotely-located data processing system is organized according to the digital identifier.

17. The playback device of claim 12 wherein the content source is a direct broadcast satellite source.

18. The playback device of claim 12 wherein the content source is a streaming service accessible via the network.

* * * * *